(12) United States Patent
Mattern (10) Patent No.: US 10,032,132 B2
(45) Date of Patent: *Jul. 24, 2018

(54) CHECKPOINT IDENTIFICATION CORRELATION SYSTEM AND METHOD

(76) Inventor: Jeremy Keith Mattern, Houston, TX (US)

( * ) Notice: Subject to any disclaimer, the term of this patent is extended or adjusted under 35 U.S.C. 154(b) by 70 days.

This patent is subject to a terminal disclaimer.

(21) Appl. No.: 13/543,891

(22) Filed: Jul. 9, 2012

(65) Prior Publication Data

US 2014/0012770 A1    Jan. 9, 2014

(51) Int. Cl.
| G06Q 10/10 | (2012.01) |
| G06Q 40/08 | (2012.01) |
| G06Q 30/02 | (2012.01) |
| G06Q 99/00 | (2006.01) |
| G06Q 50/26 | (2012.01) |

(52) U.S. Cl.
CPC .......... *G06Q 10/10* (2013.01); *G06Q 50/265* (2013.01)

(58) Field of Classification Search
CPC .............................. G06Q 50/265; G06Q 10/10
USPC ................................................... 705/1.1–912
See application file for complete search history.

(56) References Cited

U.S. PATENT DOCUMENTS

| 4,636,622 | A * | 1/1987 | Clark | G07C 9/00087 235/380 |
| 6,363,351 | B1 * | 3/2002 | Moro | G06Q 10/02 235/380 |
| 8,294,549 | B2 * | 10/2012 | Samovar | G07C 9/00103 235/379 |
| 9,035,746 | B2 * | 5/2015 | Rechner | G07C 9/00079 340/5.2 |
| 2003/0215114 | A1 * | 11/2003 | Kyle | G06F 21/32 382/115 |
| 2005/0039014 | A1 * | 2/2005 | Sajkowsky | 713/172 |
| 2005/0093675 | A1 * | 5/2005 | Wood et al. | 340/5.21 |
| 2005/0171787 | A1 * | 8/2005 | Zagami | 705/1 |
| 2005/0258238 | A1 * | 11/2005 | Chapman | G06K 19/07381 235/380 |
| 2006/0184801 | A1 * | 8/2006 | Wood | G07C 9/00031 713/186 |
| 2006/0206246 | A1 * | 9/2006 | Walker | G06Q 10/00 701/16 |
| 2006/0206724 | A1 * | 9/2006 | Schaufele | G06F 21/32 713/186 |
| 2007/0119924 | A1 * | 5/2007 | Register, Jr. | G06K 19/04 235/380 |
| 2009/0266882 | A1 * | 10/2009 | Sajkowsky | 235/380 |

(Continued)

*Primary Examiner* — Jonathan P Ouellette (74) *Attorney, Agent, or Firm* — Jonathan M. Pierce; Porter Hedges LLP (57) ABSTRACT

An improved checkpoint identification correlation system and method is described herein. In one embodiment, the method for performing background check can comprise storing military identification card information and civilian identification card information in a member profile, collecting data from a military identification card at a checkpoint, querying the database to locate the member profile comprising the military card information, and performing a background check query from one or more public information databases. In this method, the member profile can be in a database on a pass control application server. The background check can be performed using the civilian identification card information.

16 Claims, 10 Drawing Sheets

(56) References Cited

U.S. PATENT DOCUMENTS

2011/0204142 A1* 8/2011 Rao ..................... G06Q 10/06
235/380

* cited by examiner

Identification Card Information (800)

- Military Identification Information (801)
- Civilian Identification Information (802)

Fig. 8

Creating one or more driver profiles in a Military Installation Memory (407) on a Military Installation Server (106), each of said driver profile comprising one or more Identity Information (208) and a driving record, said driving record comprising a driver permission status Transmitting to a Pass Control Application Server (105) at least a portion of said driver Identity Information (208) related to each driver profile wherein said driver permission status comprises a revocation Storing in said memory said military base driving revocation associated with said military member

Fig. 9

CHECKPOINT IDENTIFICATION CORRELATION SYSTEM AND METHOD

BACKGROUND

This disclosure relates to an improved checkpoint identification correlation system and method.

Before being granted entry to a military installation, a person is often subjected to a background check. Guards posted at the entrance of nearly every military installation ensure the identifications of every person, military or non-military members, before granting access to the premises. Many military installations can have hundreds to thousands of visitors a day. A background check on every visitor can be done onsite before allowing him or her to pass the premise. This can entail search on the National Criminal Information Center (NCIC), Criminal Justice Information Services (CJIS), and/or Texas Criminal Information Center (TCIC), Federal Magistrate Courts, as well as other state and local warrant databases, to ensure that each person entering has a clear background or does not have any criminal records. In addition to criminal background information, additional sources, such as deserters, and blocked access databases can be searched. However, each individual security check can take up to thirty seconds or more, significantly slowing down traffic.

Another method used to identify individuals entering military vicinity is through a military ID. A standard military ID or Geneva Conventions Identification card issued by the United States Department of Defense can serve as an identity document, which distinguishes an individual as personnel or a service member of the US Military. Moreover, dependents of military personnel such as a child or a spouse can also hold a military ID. Even though a military ID can be presented and can sometimes be sufficient to enter a facility, there are times that other background information may be needed and/or checked. However, a military ID is not associated with other identification other than a military relationship. As such, additional information may be needed to ensure that a member is not prohibited from entering said vicinity. Thus, a military member and/or his dependents can also be subjected to the standard background check, which is time-consuming, inefficient, and inconvenient.

Another method of controlling those entering a military installation is through government tags such as Department of Defense (DOD) decals, and/or passes. DOD decals are stickers attached to the windshields of vehicles owned by military personnel, family members, or civilians who works on the military installation. It is a driving privilege consented and issued by the DOD. A driver or an owner of vehicle with decals can be identified as authorized personnel to enter a military installation. There are instances when driving privileges can be revoked; this can happen once installation or facility regulations or laws are violated. In such scenario, decal and/or passes, as well as driving privileges can be revoked or be suspended from any decal or pass holder. Thus, any person who is suspended from this privilege can be denied from driving on the facility or installation. However, military installation revocation records and/or systems can be a separate entity and are not tied into military's checkpoint systems. Thus, when such individual with revoked privileges approaches a checkpoint at a military installation it may not be readily accessible by guard personnel for verification or identification.

As such, it would be useful to have improved checkpoint identification correlation system and method.

SUMMARY

An improved checkpoint identification correlation system and method is described herein. In one embodiment, the method for performing background check can comprise storing military identification card information and civilian identification card information in a member profile, collecting data from a military identification card at a checkpoint, querying the database to locate the member profile comprising the military card information, and performing a background check query from one or more public information databases. In this method, the member profile can be in a database on a pass control application server. The background check can be performed using the civilian identification card information.

In another embodiment, the method for performing background check can comprise storing military identification card information and civilian identification card information in a member profile, collecting data from a civilian identification card at a checkpoint, querying the database to locate the member profile comprising the civilian identification card information, and performing a background check from a military database. In this embodiment, the member profile can be stored in a database on a pass control application server. The background check performed using the military identification card information.

Lastly, in one embodiment, the system for performing a background check can comprise a computer usable medium having a computer readable program code embodied therein. The computer readable program code is adapted to be executed to implement the above mentioned methods.

DETAILED DESCRIPTION

An improved checkpoint identification correlation method is described herein. The following description is presented to enable any person skilled in the art to make and use the invention as claimed and is provided in the context of the particular examples discussed below, variations of which will be readily apparent to those skilled in the art. In the interest of clarity, not all features of an actual implementation are described in this specification. It will be appreciated that in the development of any such actual implementation (as in any development project), design decisions must be made to achieve the designers' specific goals (e.g., compliance with system- and business-related constraints), and that these goals will vary from one implementation to another. It will also be appreciated that such development effort might be complex and time-consuming, but would nevertheless be a routine undertaking for those of ordinary skill in the field of the appropriate art having the benefit of this disclosure. Accordingly, the claims appended hereto are not intended to be limited by the disclosed embodiments, but are to be accorded their widest scope consistent with the principles and features disclosed herein.

Figure 1A:
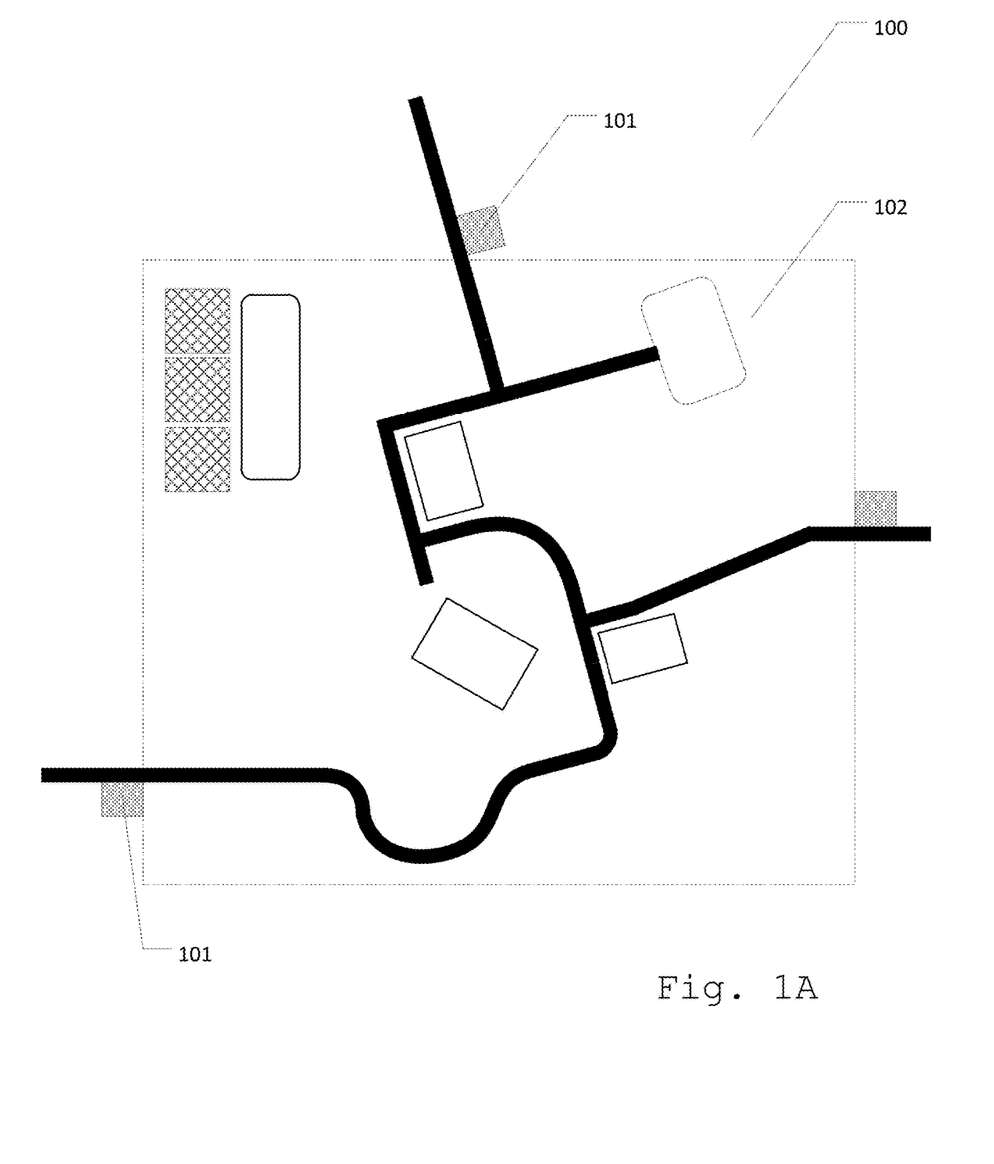
FIG. 1A illustrates an aerial view of a facility.

FIG. 1A illustrates an aerial view of a facility 100 comprising one or more checkpoints 101 strategically placed around secured area 102. Facility 100 can refer to any public or private installations designed to restrict unauthorized individuals from accessing, such as a military base, and/or a military installation. Secured area 102 can be the area within the border of facility 100. Secured area 102 can be the area protected and restricted by checkpoints 101. Checkpoints 101 can be a structure or an area within facility 100 that functions as an entry point into secured area 102. Vehicles and/or visitors can be subjected to inspections and background check before passing through checkpoints 101. For purposes of this disclosure, the term "visitor" can comprise any person at checkpoint 101 attempting to obtain a pass, permission, or qualification to enter secured area 102.

Figure 1B:
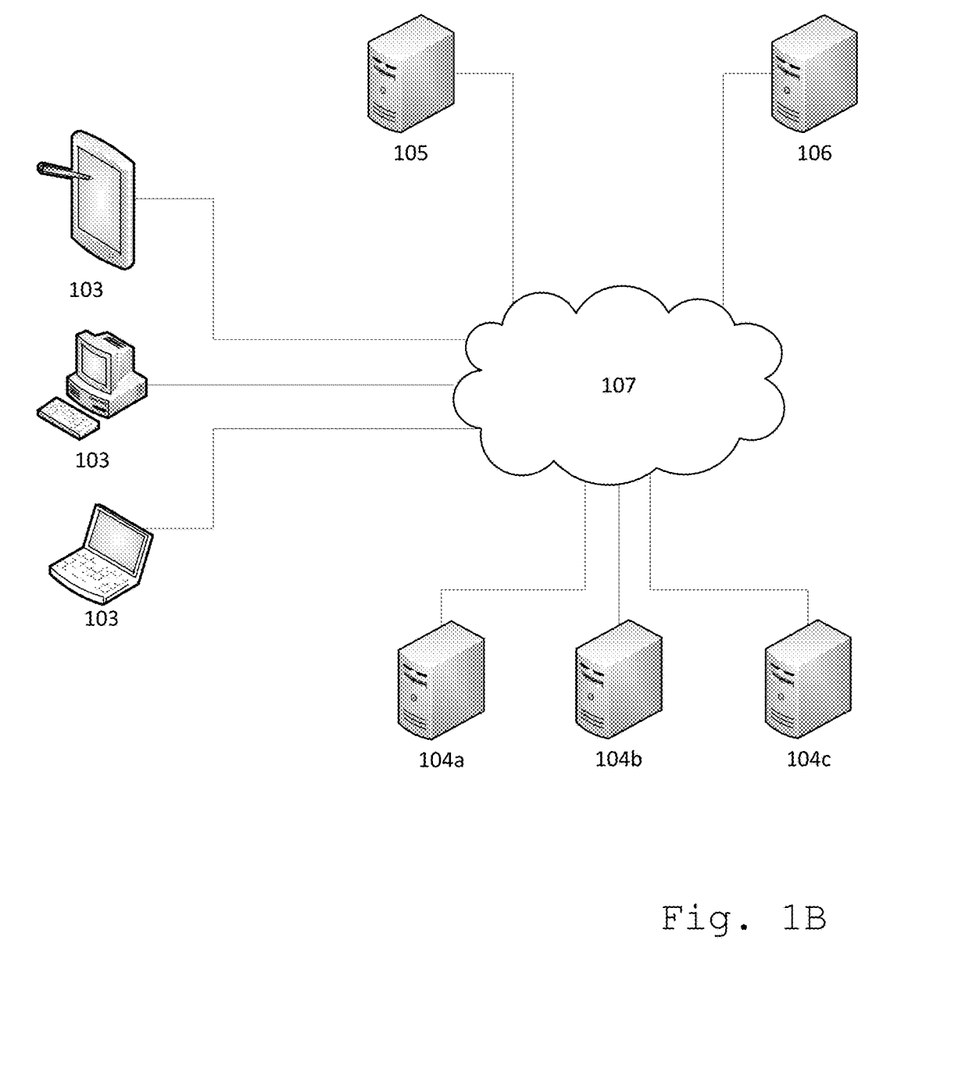
FIG. 1B illustrates a background check system.

FIG. 1B illustrates a background check system comprising a plurality of checkpoint computers 103, one or more public record databases 104, a pass control server 105, and a military citation record server 106 connected via a network 107. Checkpoint computer 103 can include, but is not limited to, a desktop, a laptop and/or a mobile device. Public record data base 104 can be one or more databases connected on a network 107 capable of storing files, and data information from different government office, agencies, National Criminal Information Center (NCIC), Criminal Justice Information Services (CJIS), the Department of Justice (DOJ), and/or Texas Criminal Information Center (TCIC), as well as other state and local warrant databases. Pass control server 105 can be one or more device capable of performing computational task, and storing data information. Pass control server 105 can provide and perform computational task across network 107. Military citation record server 106 can be one or more devices used to store citation and driving record information on individuals that is accessible through network 107. Citations can be issued to a service member or civilian for any violations of codes committed, such as talking on a cellular phone while driving, speeding or failing to stop at a stop sign. These citations can be recorded, organized, and stored in military citation record server 106. Network 107 can be a wide area network (WAN), or a combination of local area network (LAN), and/or piconets. Network 107 can be hard-wired, wireless, or a combination of both. A LAN can be a network within a single organization while WAN can be the Internet.

Figures 2A, 2B:
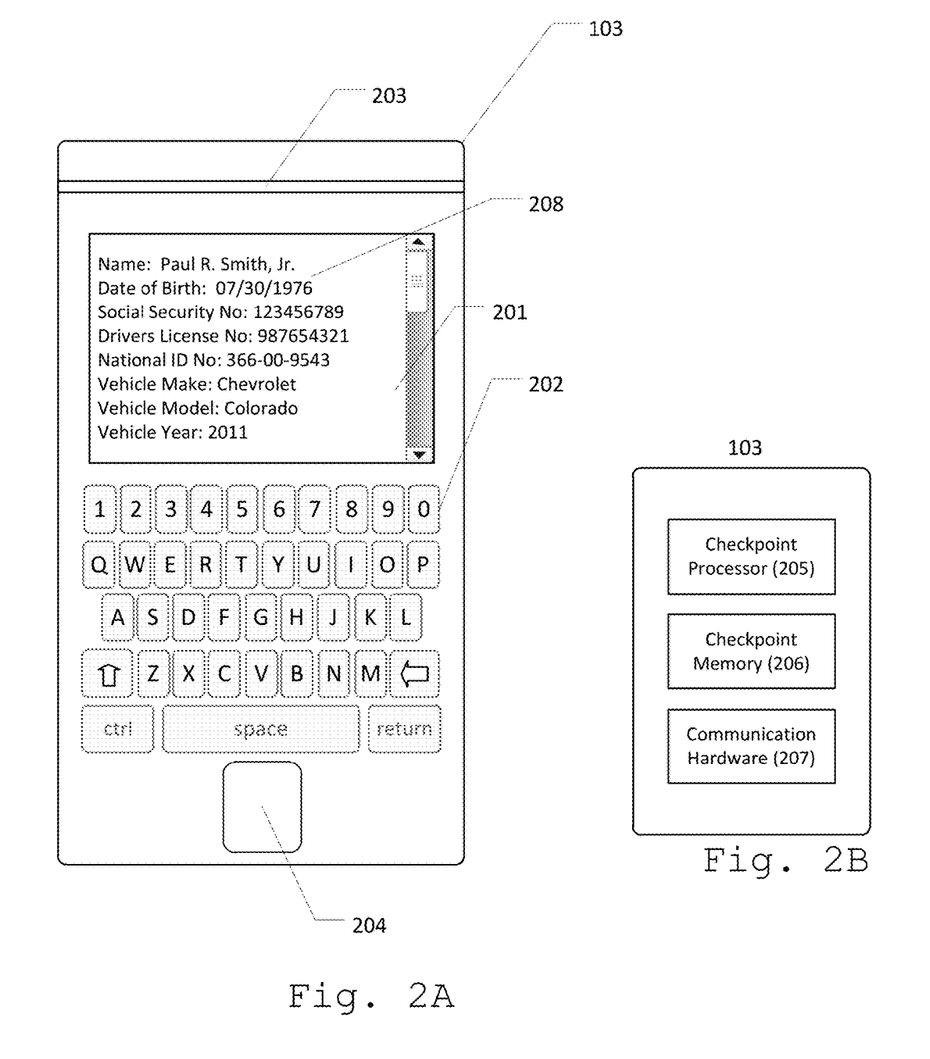
FIG. 2A illustrates an embodiment of a checkpoint computer as a mobile device.
FIG. 2B illustrates an internal hardware within a checkpoint computer.

FIG. 2A illustrates an embodiment of checkpoint computer 103 as a mobile device. Mobile device can include, but is not limited to, a screen 201, a keypad 202, a card reader 203, and/or a fingerprint scanner 204. Other input devices can include track balls, joy sticks, or scroll wheels. Screen 201 can be a mere display output, or can also be a touch screen, allowing for capturing of identity information 208. Identity information 208 can include a visitor's name, military rank, serial number, grade, military organization, military installation, address, and/or date of birth. Keypad 202 can comprise of a plurality of physical buttons on mobile device, however in an embodiment were screen 201 is a touch screen, keypad 202 can be represented virtually on screen 201. Card reader 203 can read information from an identification card. An identification card can encode information in various ways. Information can be printed on the information card. Also, information can be placed on the card in a machine-readable form. Such forms can include magnetic strip, barcode or even radio frequency identification (RFID) chip. An identification card can include, but is not limited to, a civilian or military identification card, a passport, a school identification badge or a credit card. In one embodiment, card reader 203 can read a magnetic strip on an identification card. In another embodiment, card reader 203 can read information encoded in a barcode on an identification card. In another embodiment card reader 203 comprises a (RFID) chip receiver to read an RFID chip in an identification card. In one embodiment, mobile device can read information encoded in a digital fingerprint scanned from a fingerprint scanner 204. In another embodiment, card reader 203 can read an integrated circuit card such as a Smart Card.

FIG. 2B illustrates internal hardware within checkpoint computer 103. Identity information 208 from screen 201, keypad 202 and/or card reader 203 is sent to a checkpoint computer processor 205. Checkpoint processor 205 can perform processes on the data according an application stored in a checkpoint memory 206, as discussed further below. Processes can include storing identity information 208 to checkpoint computer memory 206, verifying identity information 208 conforms to preset standards or ensuring all required data has been gathered for information inquiry to be complete.

Figure 3A:
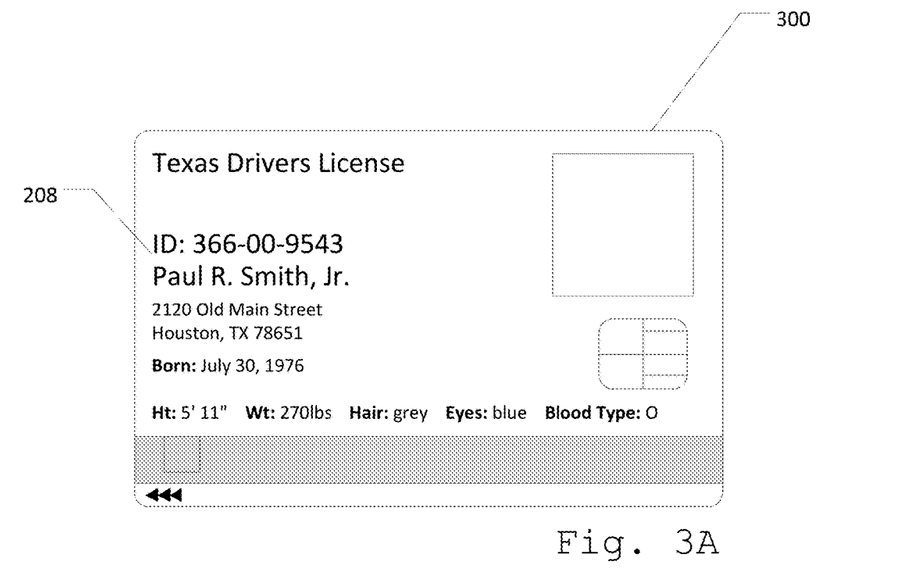
FIG. 3A illustrates a front view of an identification card.

FIG. 3A illustrates a front view of an identification card 300 comprising identity information. Identification card information can be identity information 208, and can comprise an identification number, name, address, birthday, rank, serial number, driver license number, social security number, and/or any other information encoded on identification card 300 whether written, magnetically encoded, or encoded by some other method in the art. ID can be military issued or civilian issued.

Figure 3B:
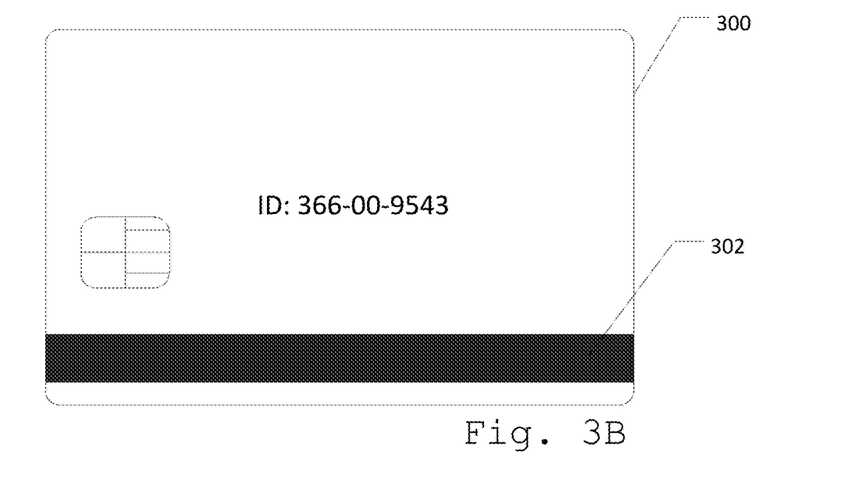
FIG. 3B illustrates a back view of an identification card.

FIG. 3B illustrates a back view of identification card 300 comprising a machine-readable zone 302. Any type of device such as a card reader can read machine-readable zone 302, which is capable of decoding and transcribing identification card information from machine-readable zone 302. Machine-readable zone 302 can be in any form such as a magnetic strip, barcode or RFID chip.

Figure 4A:
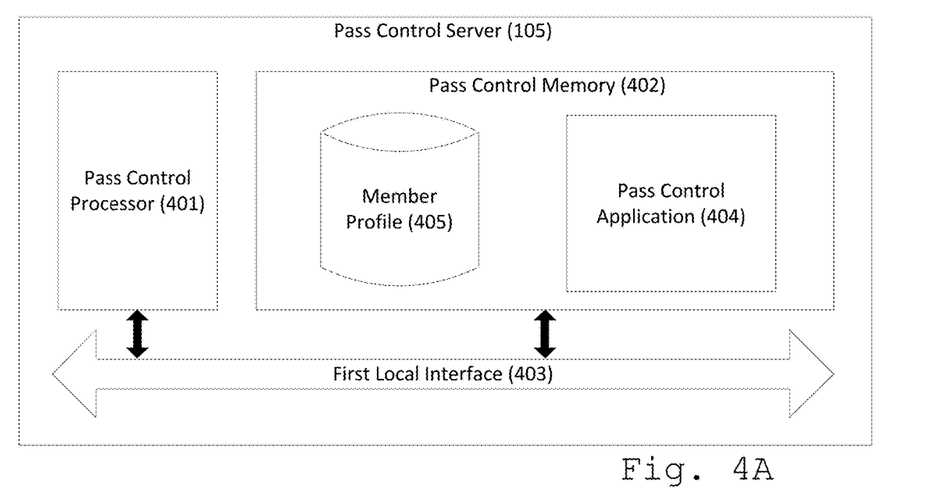
FIG. 4A illustrates a schematic diagram of a pass control server.

FIG. 4A illustrates a schematic diagram of a pass control server 105 according to an embodiment of the present disclosure. Pass control server 105 can comprise a pass control processor 401, and a pass control memory 402 and a first local interface 403. First local interface 403 can be a program that controls a display for the user, which can allow user to view and/or interact with pass control server 105. Pass control processor 401 can be a processing unit that performs sets of instructions stored within pass control memory 402. Pass control memory 402 can comprise a pass control application 404, and a member profile 405. Pass control application 404 can be a program providing logic for pass control server 105. Member profile 405 can be collections of data accessible through pass control application 404. Further, pass control application 404 can perform functions such as adding, transferring, and retrieving information on member profile 405 using first local interface 403.

Pass control server 105 includes at least one processor circuit, for example, having pass control processor 401 and pass control memory 402, both of which are coupled to first local interface 403. To this end, the pass control server 105 can comprise, for example, at least one server, computer or like device. Local interface can comprise, for example, a data bus with an accompanying address/control bus or other bus structure as can be appreciated.

Stored in pass control memory 402 described herein above are both data and several components that are executable by pass control processor 401. In particular, stored in the pass control memory 402 and executable by pass control processor 401 are pass control application 404, and potentially other applications. Also stored in pass control memory 402 can be a member profile 405 and other data. In addition, an operating system can be stored in pass control memory 402 and executable by pass control processor 401.

Figure 4B:
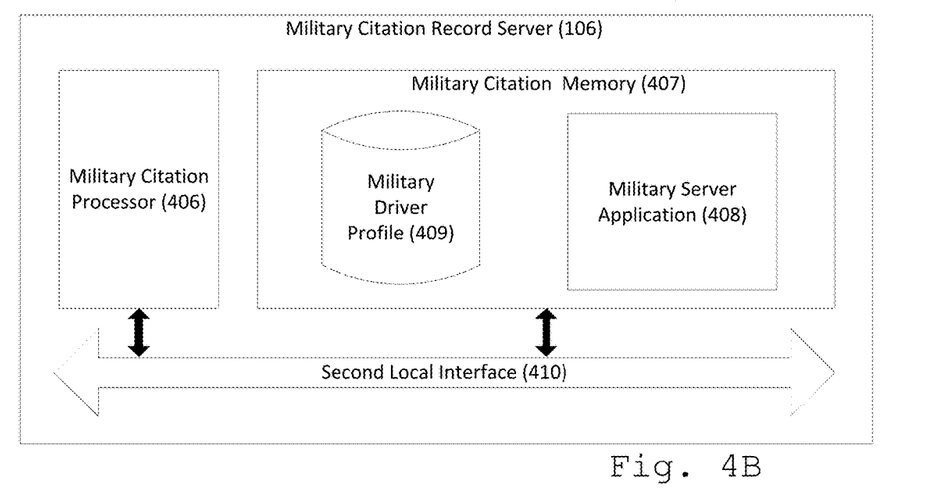
FIG. 4B illustrates a schematic diagram of a military citation record server.

FIG. 4B illustrates a schematic diagram of a military citation record server 106 according to an embodiment of the present disclosure. Military citation record server 106 can comprise a military citation processor 406, a military citation memory 407, and a second local interface 410. Second local interface 410 can be a program that controls a display for the user, which can allow user to view and/or interact with military citation record server 106. Military citation processor 406 can be a processing unit that performs set of instructions stored within military citation memory 407. Military citation memory 407 can comprise a military server application 408, and a military driver profile 409. Military server application 408 can be a program providing business logic for military citation record server 106. Military driver profile 409 can be digital collections of data accessible through military server application 408. Further, military server application 408 can perform functions such as transferring and retrieving information on military driver profile 409 using a second local interface 410. In one embodiment, pass control server 105 and military citation record server 106 can be the same device or set of devices.

Military citation record server 106 includes at least one processor circuit, for example, having military citation processor 406 and a military citation memory 407, both of which are coupled to a second local interface 410. To this end, the military citation record server 106 can comprise, for example, at least one server, computer or like device. Local interface can comprise, for example, a data bus with an accompanying address/control bus or other bus structure as can be appreciated.

Stored in military citation memory 407 described herein above are both data and several components that are executable by military citation processor 406. In particular, stored in the military citation memory 407 and executable by military citation processor 406 are military server application 408, and potentially other applications. Also stored in military citation memory 407 can be a military driver profile 409 and other data. In addition, an operating system can be stored in military citation memory 407 and executable by military citation processor 406.

It is understood that there can be other applications that are stored in pass control memory 402 and military citation memory 407 and are executable by pass control processor 401 and military citation processor 406 as can be appreciated. Where any component discussed herein is implemented in the form of software, any one of a number of programming languages can be employed such as, for example, C, C++, C#, Objective C, Java, Java Script, Perl, PHP, Visual Basic, Python, Ruby, Delphi, Flash, or other programming languages.

A number of software components can be stored in pass control memory 402 and military citation memory 407, and can be executable by pass control processor 401 and military citation processor 406. In this respect, the term "executable" means a program file that is in a form that can ultimately be run by pass control processor 401 and military citation processor 406. Examples of executable programs can be, for example, a compiled program that can be translated into machine code in a format that can be loaded into a random access portion of pass control memory 402 and military citation memory 407, and run by pass control processor 401 and military citation processor 406, source code that can be expressed in proper format such as object code that is capable of being loaded into a random access portion of pass control memory 402 and military citation memory 407, and executed by pass control processor 401 and military citation processor 406, or source code that can be interpreted by another executable program to generate instructions in a random access portion of pass control memory 402 and military citation memory 407, to be executed by pass control processor 401 and military citation processor 406, etc. An executable program can be stored in any portion or component of pass control memory 402 and military citation memory 407 including, for example, random access memory (RAM), read-only memory (ROM), hard drive, solid-state drive, USB flash drive, memory card, optical disc such as compact disc (CD) or digital versatile disc (DVD), floppy disk, magnetic tape, network attached/addressable storage, or other memory components.

Figure 5A:
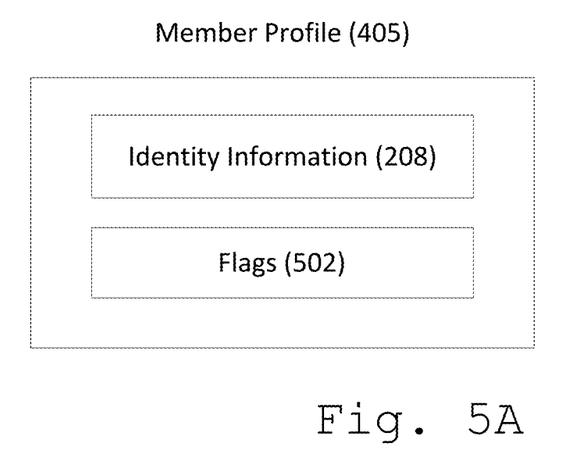
FIG. 5A illustrates member profile further comprising identification information, and flags.

FIG. 5A illustrates member profile 405 further comprising, one or more identity information 208 such as identification card information, and flags 502. Identity information 208 within a profile can be a collection of information data from a visitor. Flags 502 can comprise a notification that member can receive a pass to enter, can represent an allowance to enter by presence of no flags 502, or can comprise one or more representations of holds that prevent a member from entering an area. In such embodiment, flags 502 can be one or more references to criminal records, warrants, or terrorist ties, found on public record databases 104.

Figure 5B:
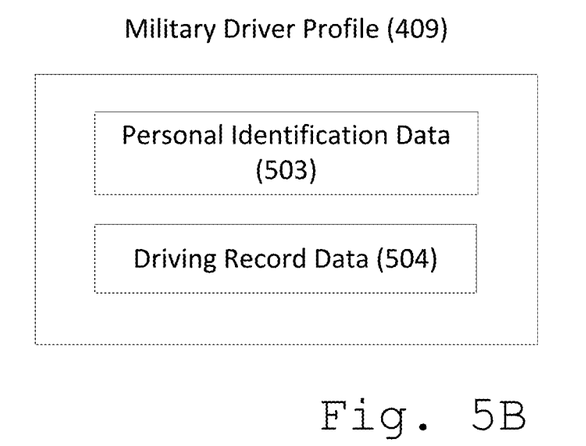
FIG. 5B illustrates a military driver profile comprising personal identification data, and driving record data.

FIG. 5B illustrates a military driver profile 409. Military driver profile 409 can comprise personal identification data 503 and driving record data 504. Personal identification data 503 can comprise but are not limited to, name, address, telephone number, and/or government issued ID numbers, either military, civilian, or both. Driving record data 504 can comprise past citations, adjudication records, and/or penalties assessed, including suspensions, revocations, or cancellations of installation driving privileges.

Figure 6:
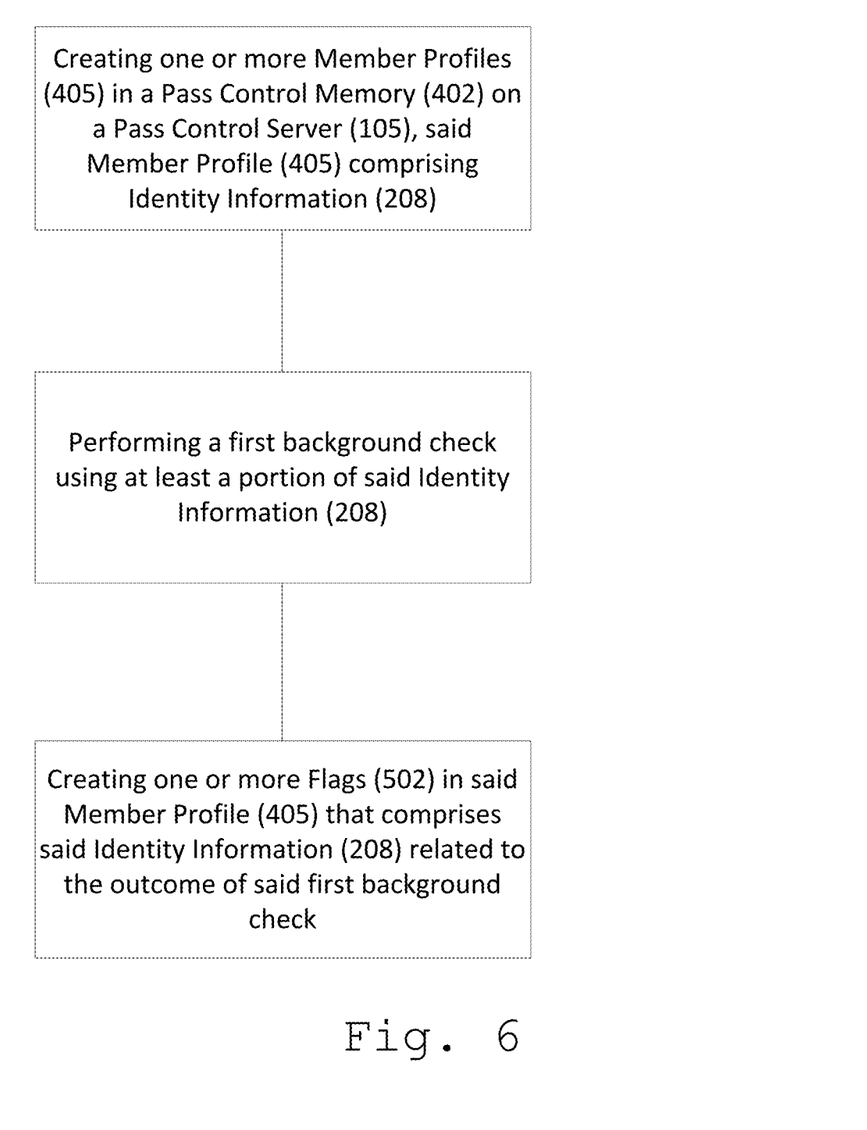
FIG. 6 illustrates a method for creating member profile and initially populating member profile.

FIG. 6 illustrates a method for creating member profile 405 and initially populating member profile 405. In a registration scenario, a user or an authorized data personnel can use checkpoint computer 103 to gain access in pass control application 404. Once granted access, identity information can be stored in member profile 405. After member profile 405 is created, pass control application 404 can use the personal information stored, such as name, address, and/or ID numbers, from member profile 405 to query records within public record database 104 and/or military citation record server 106 to find out if the registered member has warrants, criminal record, driving revocation or terrorist watch-list status that would preclude their admission or driving onto secured area 102. In one embodiment, the revocation can comprise an expiration. Such expiration tells when the revocation is no longer in effect. The result of the query can be stored in flags 502. In another embodiment, member profile 405 can be stored as either "Cleared" or "Denied". Further, a regular, periodic, and/or random query by pass control application 404 can be made on member profile 405 ensuring that data and flags 502 are updated. Such periodic update, for example, can be done daily, weekly or monthly.

Figure 7A:
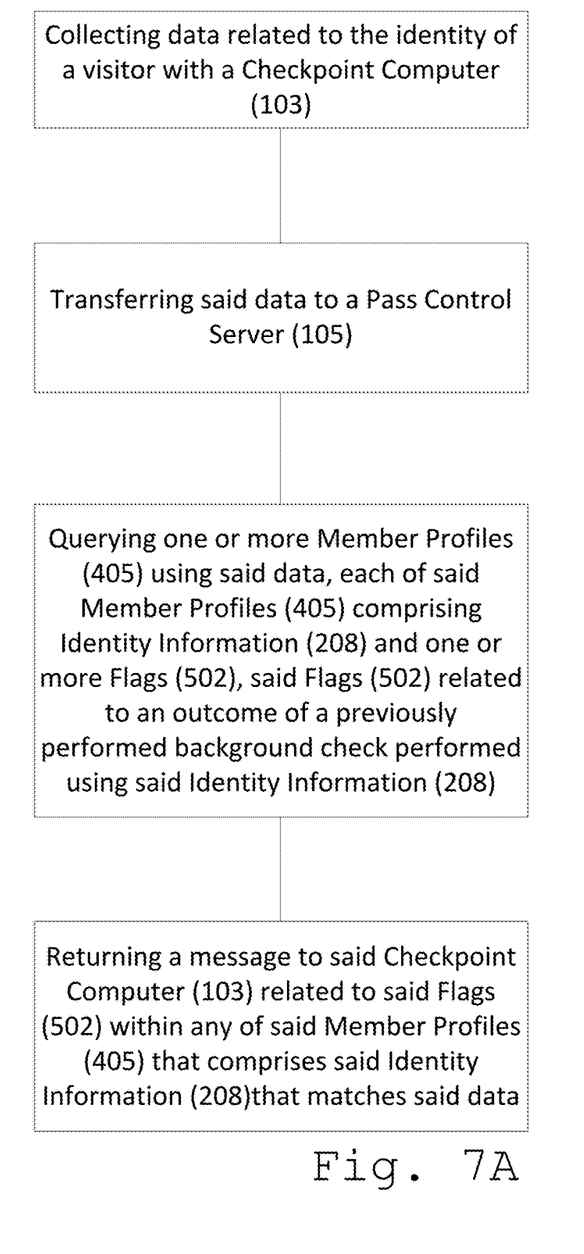
FIG. 7A illustrates an exemplary method for providing pass control at a checkpoint.

FIG. 7A illustrates an exemplary method for providing pass control at checkpoints 101. At checkpoints 101, the guards on duty can get an identification card 300 or other identity information 208 from the visitor. Using checkpoint computer 103, guard can gather identity information 208. In one embodiment, the guard can swipe the identification card 300 with card reader 203 connected or otherwise a part of checkpoint computer 103. Information entered by the guard can be sent as data from checkpoint computer 103, over network 107, to pass control server 105. Pass control application 404 can query member profiles 405 to determine if the visitor at checkpoint 101 has any flags 502 that would preclude entry. If the query produces no flags 502, pass control server 105 can send a "clear" message to checkpoint computer 103. If flags 502 are present, either pass control server 105 can send a "deny" message to checkpoint computer 103, and/or flags 502 can be sent to checkpoint computer 103. In a scenario wherein the visitor is not a registered member with pass control application 404, the visitor can be requested to register.

Figure 7B:
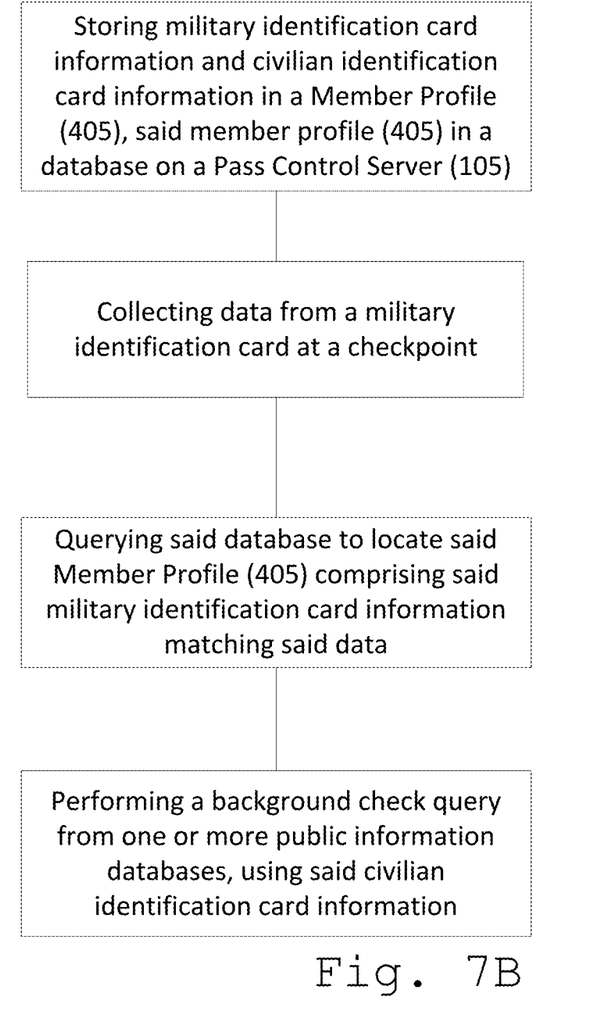
FIG. 7B illustrates another exemplary method for providing pass control at a checkpoint.

FIG. 7B illustrates another exemplary method for providing pass control at checkpoint 101. In such embodiment, the guard can swipe identification card 300 with card reader 203 attached to checkpoint computer 103 or otherwise collect identity information 208. Identity information 208 entered by the guard can be sent as data from checkpoint computer 103, over network 107 to military citation record server 106. Military server application 408 can query military driver profiles 409 to determine if the member at the gate has any driving record data 504 that would preclude entry. If the query produces no such data, pass control server 105 can send a "clear" message to checkpoint computer 103. If flags 502 are present that would preclude pass validation, either military citation record server 106 or pass control server 105 can send a "deny" message to checkpoint computer 103, and/or flags 502 can be sent to checkpoint computer 103.

Figure 8:
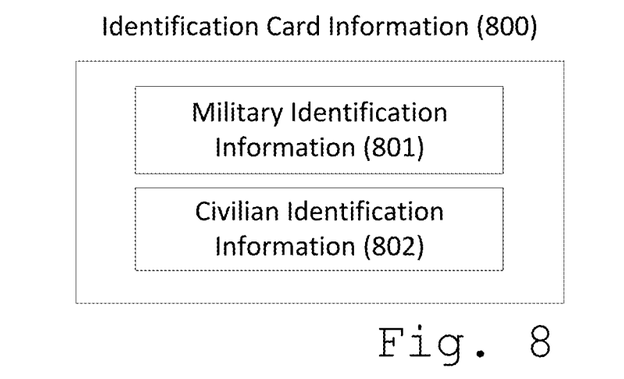
FIG. 8 illustrates exemplary identification card information.

FIG. 8 illustrates identification card information 800. In one embodiment, identity information 208 within pass control memory 402 can comprise military identification card information 801 and civilian identification card information 802. For military personnel as well as some civilians, a military ID can be a standard identification card 300 on a military installation. Since, military IDs typically contain information not useful for a query of public records database 104, pairing it with civilian identification card information or other identity information can be useful. In such embodiment, a person with a military ID can approach a checkpoint 101 with only his military ID. The guard can enter military ID information 801 into checkpoint computer 103, and checkpoint computer 103 can send military ID information 801 to pass control application 404. Pass control application 404 can locate member profile 405 using military ID information 801 to find matching civilian ID information 802 and/or flags 502. In one embodiment, upon retrieving civilian ID information 802, pass control application 404 can run another background check, and return the results to the guard.

Figure 9:
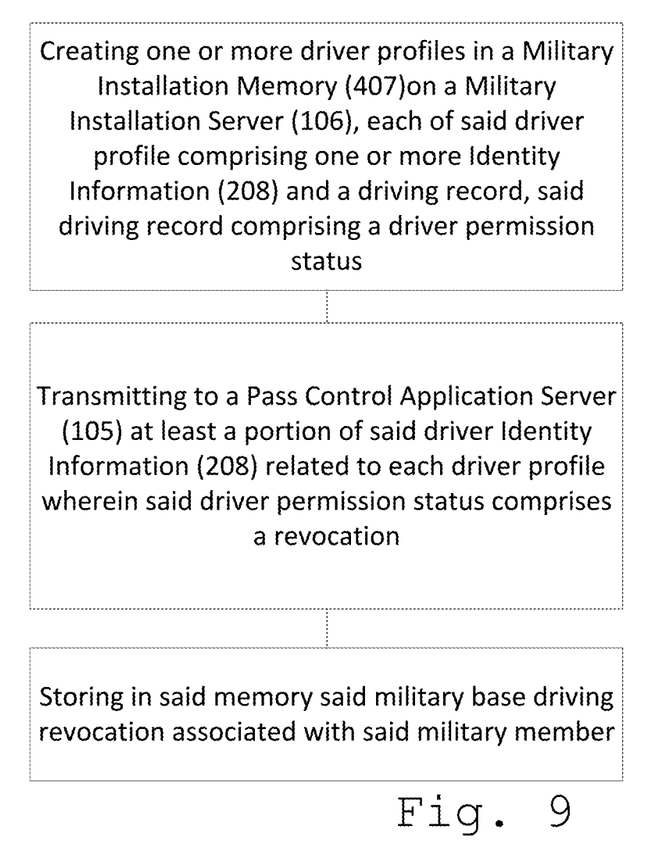
FIG. 9 illustrates an exemplary method for enforcing driving restrictions on a military base.

FIG. 9 illustrates an exemplary method for enforcing driving restrictions on facility 100. Military driver profile 409 can contain personal identification data 503 and driving record data 504 that can include records of military installation driving privilege revocation. In one embodiment, military server application 408 can periodically or as new data is available, transfer personal identification data 503 of individuals with driving restrictions to pass control server 105. When a person approaches checkpoint 101 with an identification card 300, a query based on information from the identification card 300 provided will be sent to pass control server 105, and compared against the data sent from military citation record server 106. If a driving restriction or revocation is found by pass control application 404, the person can be restricted from driving on the installation.

For purposes of this disclosure, pass control memory 402 and military citation memory 407 is defined herein as comprising volatile memory, nonvolatile memory, and/or data storage components. Volatile components are those that do not retain data values upon loss of power. Nonvolatile components are those that retain data upon a loss of power. Thus, pass control memory 402 and military citation memory 407 can comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, network attached/addressable storage, and/or other memory components, or a combination of any two or more of these memory components. In addition, the RAM can comprise, for example, static random access memory (SRAM), dynamic random access memory (DRAM), or magnetic random access memory (MRAM) and other such devices. The ROM can comprise, for example, a programmable read-only memory (PROM), an erasable programmable read-only memory (EPROM), an electrically erasable programmable read-only memory (EEPROM), or other like memory device.

Also, pass control processor 401 and military citation processor 406 can represent multiple pass control processor 401 and military citation processor 406, and pass control memory 402 and military citation memory 407 can represent multiple pass control memory 402 and military citation memory 407 that operate in parallel processing circuits, respectively. In such a case, first local interface 403 and second local interface 410 can be an appropriate network, including network 107 that facilitates communication between any two of the multiple pass control processor 401 and military citation processor 406, between any pass control processor 401 and military citation processor 406, and any of the pass control memory 402 and military citation memory 407, or between any two of the pass control memory 402 and military citation memory 407, etc. First local interface 403 and second local interface 410 can comprise additional systems designed to coordinate this communication, including, for example, performing load balancing. Pass control processor 401 and military citation processor 406 can be of electrical or of some other available construction.

Although pass control application 404 and military server application 408, and other various systems described herein can be embodied in software or code executed by general purpose hardware as discussed above, as an alternative the same can also be embodied in dedicated hardware or a combination of software/general purpose hardware and dedicated hardware. If embodied in dedicated hardware, each can be implemented as a circuit or state machine that employs any one of or a combination of a number of technologies. These technologies can include, but are not limited to, discrete logic circuits having logic gates for implementing various logic functions upon an application of one or more data signals, application specific integrated circuits having appropriate logic gates, or other components, etc. Such technologies are generally well known by those skilled in the art and, consequently, are not described in detail herein.

The flowcharts of FIG. 6, FIG. 7A, FIG. 7B, and FIG. 9 show the functionality and operation of an implementation of portions of pass control application 404 and military server application 408. If embodied in software, each block can represent a module, segment, or portion of code that comprises program instructions to implement the specified logical function(s). The program instructions can be embodied in the form of source code that comprises human-readable statements written in a programming language or machine code that comprises numerical instructions recognizable by a suitable execution system such as pass control processor 401 and military citation processor 406 in a computer system or other system. The machine code can be converted from the source code, etc. If embodied in hardware, each block can represent a circuit or a number of interconnected circuits to implement the specified logical function(s).

Although the flowcharts of FIG. 6, FIG. 7A, FIG. 7B, and FIG. 9 show a specific order of execution, it is understood that the order of execution can differ from that which is depicted. For example, the order of execution of two or more blocks can be scrambled relative to the order shown. Also, two or more blocks shown in succession in FIG. 6, FIG. 7A, FIG. 7B, and FIG. 9 can be executed concurrently or with partial concurrence. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including pass control application 404 and military server application 408, that comprises software or code can be embodied in any computer-readable storage medium for use by or in connection with an instruction execution system such as, for example, pass control processor 401 and military citation processor 406 in a computer system or other system. In this sense, the logic can comprise, for example, statements including instructions and declarations that can be fetched from the computer-readable storage medium and executed by the instruction execution system.

In the context of the present disclosure, a "computer-readable storage medium" can be any medium that can contain, store, or maintain the logic or application described herein for use by or in connection with the instruction execution system. The computer-readable storage medium can comprise any one of many physical media such as, for example, electronic, magnetic, optical, electromagnetic, infrared, or semiconductor media. More specific examples of a suitable computer-readable storage medium would include, but are not limited to, magnetic tapes, magnetic floppy diskettes, magnetic hard drives, memory cards, solid-state drives, USB flash drives, or optical discs. Also, the computer-readable storage medium can be a random access memory (RAM) including, for example, static random access memory (SRAM) and dynamic random access memory (DRAM), or magnetic random access memory (MRAM). In addition, the computer-readable storage medium can be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications can be made to the above-described embodiment(s) without departing substantially from the spirit and principles of the disclosure. All such modifications and variations are intended to be included herein within the scope of this disclosure and protected by the following claims.

Various changes in the details of the illustrated operational methods are possible without departing from the scope of the following claims. Some embodiments may combine the activities described herein as being separate steps. Similarly, one or more of the described steps may be omitted, depending upon the specific operational environment the method is being implemented in. It is to be understood that the above description is intended to be illustrative, and not restrictive. For example, the above-described embodiments may be used in combination with each other. Many other embodiments will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein."

What is claimed is:

1. A method for performing a background check comprising;
    storing, by a server application running on a pass control application server, military identification card information and civilian identification card information in a member profile, said member profile being stored in a database on the pass control application server;
    scanning a military identification card of a visitor at a checkpoint with a card reader;
    collecting data from the military identification card at the checkpoint by the card reader connected to a checkpoint computer;
    initiating a query of said database to locate said member profile comprising said military identification card information matching said data, wherein initiating said query comprises a checkpoint computer application running on the checkpoint computer sending said data collected from the military identification card to said server application;
    performing said query by said server application;
    performing, by said server application, a background check query from one or more public information databases, using said civilian identification card information stored in said member profile comprising said military identification card information matching said data collected from the military identification card at the checkpoint; and validating a pass into a facility based on a finding of said background check.

2. The method of claim 1 wherein said facility is a military installation.

3. The method of claim 1 wherein said civilian identification card information comprises information from a driver's license.

4. The method of claim 1 wherein said civilian identification card information comprises information from a social security card.

5. The method of claim 1 wherein said civilian identification card information comprises information from a passport.

6. The method of claim 1 wherein said one or more public information databases comprises the National Criminal Information Center database.

7. The method of claim 1 wherein said one or more public information databases comprises federal, state, or local law enforcement databases.

8. The method of claim 1 wherein said one or more public information databases comprises a state warrant database and a local warrant database.

9. The method of claim 1 wherein said background check comprises checking for outstanding warrants.

10. The method of claim 1 wherein said background check comprises checking for known terrorists and suspected terrorists.

11. The method of claim 1 comprising obtaining identity information from the military information card, and using the identity information from the military identification card to perform an initial background check for military information, and for a second background check finding civilian information on a public record database using the identity information from the military identification card.

12. A non-transitory computer usable medium having a computer readable program code embodied therein, wherein the computer readable program code is adapted to be executed to implement the steps:
storing, by a server application running on a pass control application server, military identification card information and civilian identification card information in a member profile, said member profile being stored in a database on the pass control application server;
scanning a military identification card of a visitor at a checkpoint with a card reader;
collecting data from the military identification card at the checkpoint by the card reader connected to a checkpoint computer;
initiating a query of said database to locate said member profile comprising said military identification card information matching said data, wherein initiating said query comprises a checkpoint computer application running on the checkpoint computer sending said data collected from the military identification card to said server application;
performing said query by said server application; and
performing, by said server application, a background check query from one or more public information databases, using said civilian identification card information stored in said member profile comprising said military identification card information matching said data collected from the military identification card at the checkpoint.

13. A method for performing a background check comprising;
storing, by a server application running on a pass control application server, military identification card information and civilian identification card information in a member profile, said member profile being stored in a database on the pass control application server;
scanning a civilian identification card of a visitor at a checkpoint with a card reader;
collecting data from the civilian identification card at the checkpoint using the card reader connected to a checkpoint computer;
initiating a query of said database to locate said member profile comprising said civilian identification card information matching said data, wherein initiating said query comprises a checkpoint computer application running on the checkpoint computer sending said data collected from the civilian identification card to said server application;
performing said query by said server application;
performing, by said server application, a background check query from a military database, using said military identification card information stored in said member profile comprising said civilian identification card information matching said data collected from the civilian identification card at the checkpoint; and
validating a pass into a facility based on a finding of said background check.

14. The method of claim 13 wherein said military database comprises driving records.

15. The non-transitory computer usable medium of claim 12, wherein the computer readable program code is adapted to be executed to further implement the steps:
obtaining identity information from the military information card, and
using the identity information from the military identification card to perform an initial background check for military information, and for a second background check finding civilian information on a public record database using the identity information from the military identification card.

16. The method of claim 13 comprising obtaining identity information from the civilian information card, and using the identity information from the civilian identification card to perform an initial background check for civilian information, and for a second background check finding military information on a public record database using the identity information from the civilian identification card.

* * * * *